United States Patent [19]
Murray

[11] 4,408,623
[45] Oct. 11, 1983

[54] ELECTRICAL MANICURING DEVICE
[76] Inventor: Grant Murray, 15815 Bitridge, Houston, Tex. 77053
[21] Appl. No.: 277,966
[22] Filed: Jun. 26, 1981
[51] Int. Cl.³ .................... A45D 29/05; F16H 25/08
[52] U.S. Cl. ............................. 132/73.6; 132/75.8; 132/76.4; 74/22 A
[58] Field of Search .............. 132/73.6, 75.6, 75.8, 132/76.4; 433/118; 29/76 A; 51/59 R; 15/22 R, 22 A; 74/22 R, 22 A

[56] References Cited
U.S. PATENT DOCUMENTS

| | | | |
|---|---|---|---|
| 1,742,862 | 1/1930 | Jones | 132/75.8 |
| 2,998,676 | 9/1961 | Hawkins | 51/59 R X |
| 3,240,966 | 3/1966 | Thompson | 132/73.6 X |
| 3,806,980 | 4/1974 | Belsito | 15/22 R |
| 3,984,890 | 10/1976 | Collis | 15/22 R |
| 4,103,694 | 8/1978 | Burian et al. | 132/73.6 |

FOREIGN PATENT DOCUMENTS 2809954  9/1978  Fed. Rep. of Germany ..... 74/22 R

Primary Examiner—Robert P. Swiatek
Attorney, Agent, or Firm—Carwell & Helmreich

[57] ABSTRACT

A battery powered manicuring device is taught which uses an improved drive mechanism for reciprocating a manicuring implement. A battery energizes a motor. Extending from one end of the motor is a shaft. Interconnected with the shaft is an offset device comprising either a bearing or a sleeve positioned at a non-perpendicular angle with respect to the shaft. The lower end of an attachment arm is affixed to the outer portion of either the offset bearing or the offset sleeve. The upper end of the attachment arm is affixed to the lower end of a manicuring implement. As the shaft rotates, a reciprocating motion is imparted to the attachment arm and thus to the manicuring implement.

15 Claims, 9 Drawing Figures

U.S. Patent  Oct. 11, 1983  Sheet 1 of 2  4,408,623
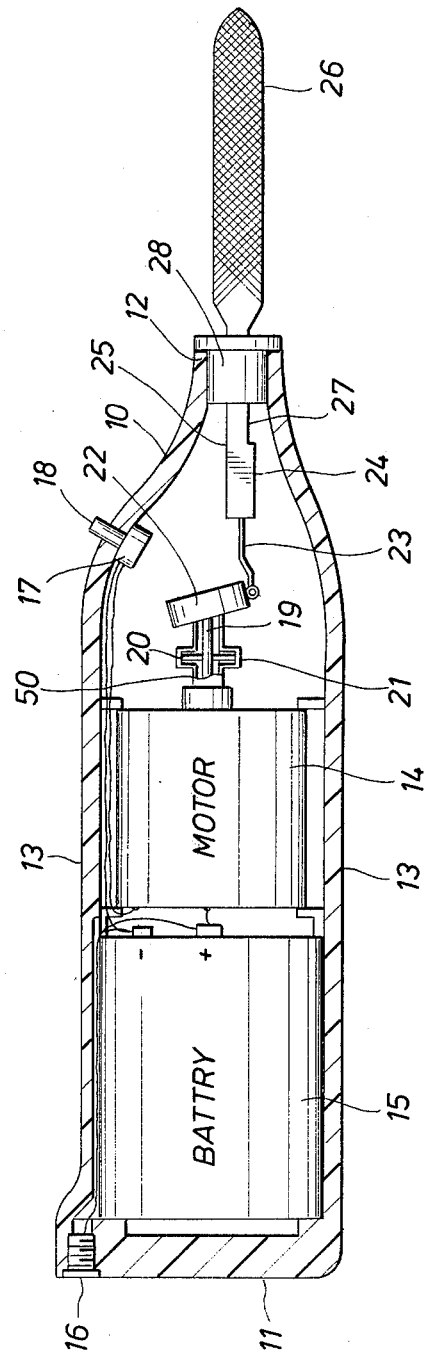
FIG. 1
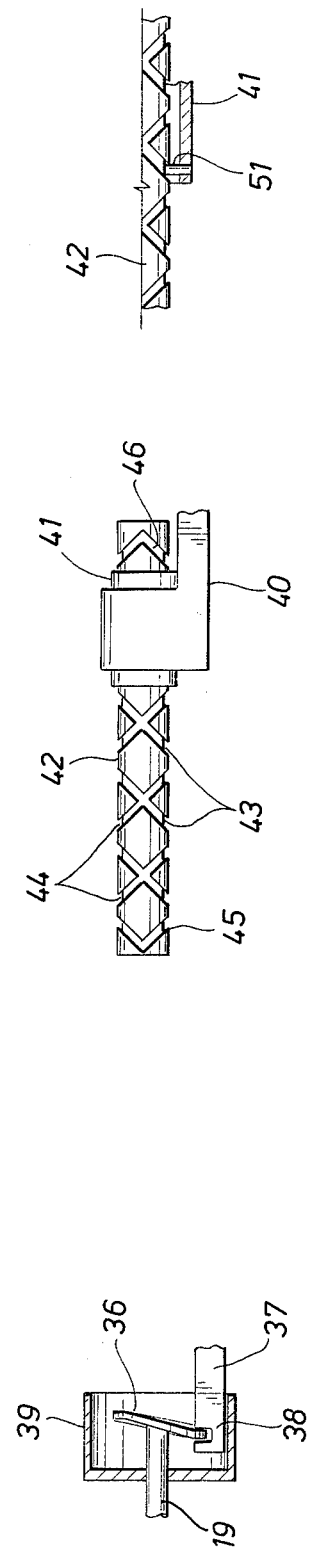
FIG. 4B
FIG. 4A
FIG. 3

ELECTRICAL MANICURING DEVICE

BACKGROUND OF THE INVENTION

This invention relates generally to manicuring devices, and more particularly to portable battery powered manicuring devices wherein the manicuring implement is reciprocated by means of an electrical motor and by the improved drive means.

The majority of prior art electrical manicuring devices require an alternating current as a power source. Examples of such devices are taught in U.S. Pat. No. 2,880,737 to Tone et al., U.S. Pat. No. 1,831,327 to Surdock, and U.S. Pat. No. 2,239,870 to Ariza. Such devices have a major disadvantage in that they cannot be used in any location where an electrical outlet is not readily available.

Battery powered manicuring devices are also known in the art. U.S. Pat. No. 3,916,921 to Pesola teaches a battery powered solenoid to achieve reciprocation of a nail file. Another battery powered device is taught in U.S. Pat. No. 2,935,972 to Jones et al. Jones et al. teaches an eccentric sleeve affixed to a motor shaft, the eccentric being disposed within an aperture at the lower end of the nail file. Since the surface of the sleeve rubs against the sides of the aperture to achieve reciprocation, it may be appreciated that there will be substantial power losses due to friction. In addition, the sides of the aperture and the sleeve surface will easily become worn, rendering the Jones et al. device ineffective.

Various other drive means have been used in prior art devices, each of which having one or more of the following serious disadvantages: a large number of moving parts, lack of compactness, power losses due to friction, low reliability, and expensive in price.

Devices utilizing gear-type drives are taught in U.S. Pat. No. 2,880,737 to Tone et al., U.S. Pat. No. 1,742,862 to Jones, and U.S. Pat. No. 1,831,327 to Surdock. These and other devices using gear drives require a large number of moving parts which parts will tend to wear out, and will lose a substantial amount of power due to friction.

Examples of devices using solenoid-type drives may be found in U.S. Pat. Nos. 2,504,795 to Biasi and 3,916,921 to Pesola. Such devices generally require a source of alternating current, are complex, expensive and unreliable.

Another drive means found in the prior art uses an eccentric. For example, in U.S. Pat. No. 2,239,870 to Ariza, two pivotal means must be provided, one attached to the eccentric and the other to a manicuring implement. It may be appreciated that there will be substantial friction and thus degradation of parts at these pivotal points.

Yet another drive means is taught in U.S. Pat. No. 1,047,889 to Gooch. In Gooch, a cylinder has a pin member which travels in the cam groove of a plunger. As the cylinder rotates, the plunger reciprocates thereby imparting a rocking movement to an angle lever and reciprocating a file. The Gooch device has a large number of moving parts, some of which will tend to degrade due to the existence of three high friction pivot points.

Many prior art devices use a reciprocating file as a manicuring implement, such file having all of its cutting edges being substantially parallel. Use of such files on delicate surfaces such as finger nails, often results in the chipping or splitting of nails since such files are generally suitable only for unidirectional applications. Thus, it is desirable to provide a reciprocating manicuring implement suitable for bidirectional use.

Several prior art devices overcome the bidirectional file problem by using a round manicuring implement which rotates in a unidirectional, circular motion. However, such devices may be awkward for people who have become accustomed to using elongated manicuring files, resulting in nonuniform manicuring of the nails.

The disadvantages of the prior art, however, are overcome by the present invention and improved apparatus are provided for a battery powered, portable manicuring device.

SUMMARY OF THE INVENTION

A battery powered manicuring device is taught which uses an improved drive means for reciprocating a manicuring implement. A battery energizes a motor. Extending from one end of the motor is a shaft. Interconnected with the shaft is an offset means comprising either a bearing or a sleeve positioned at a non-perpendicular angle with respect to the shaft. The lower end of an attachment arm is affixed to the outer portion of either the offset bearing or the offset sleeve. The upper end of the attachment arm is affixed to the lower end of a manicuring implement. As the shaft rotates, a reciprocating motion is imparted to the attachment arm and thus to the manicuring implement.

It is a feature of the present invention to provide an improved power driven manicuring device which is compact and has interchangeable manicuring implements.

It is another feature of the present invention to provide an improved power driven manicuring device which has few moving parts and little loss of power due to friction, thereby resulting in increased power and efficiency.

It is yet another feature of the present invention to provide an inproved power driven manicuring device with rechargeable batteries, thereby enabling it to be used in locations where a source of alternating current is not readily available.

It is yet another feature of the present invention to provide an improved power driven manicuring device which uses a reciprocating emery board surface to prevent nail chipping and splitting.

It is yet another feature of the present invention to provide an improved power driven manicuring device which is relatively simple in construction, and which may be manufactured at low cost and by simple manufacturing methods.

These and other features and advantages of the present invention will become apparent from the following detailed description of the preferred embodiment.

IN THE DRAWINGS

FIG. 1 is a sectional side view of one embodiment of the present invention.

FIG. 3 is a side view of an offset plate and attachment arm according to the present invention.

FIG. 4A is a sectional view of a cam sleeve according to the present invention.

FIG. 4B is a cross-sectional view of the cam sleeve of FIG. 4A.

Figure 5A:
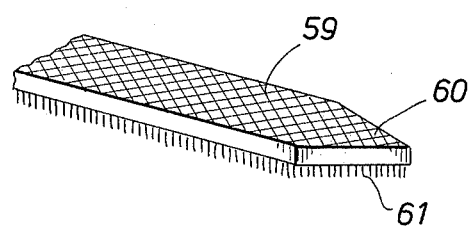
Figure 5B:
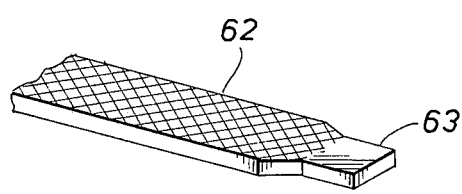
Figure 5C:
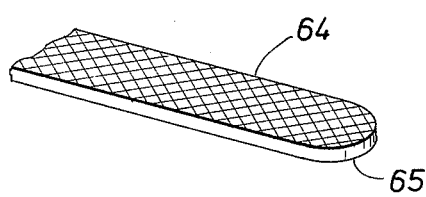

FIGS. 5A, 5B, and 5C depict other embodiments of the manicuring implement shown in FIG. 1.

DETAILED DESCRIPTION

FIG. 1 depicts one embodiment of the present invention. An elongated, hollow, cylindrically-shaped housing 10 has a closed back end 11 and an open front end 12. Housing 10 also has cylindrical sidewall surfaces 13. Reciprocation is in part achieved by means of motor 14. Motor 14 is a 1.2 volt motor which draws ½ to 1 amp without a load and ¾ to 1.5 amps with a load. It revolves at 1,500 to 2,500 rpm without a load.

Motor 14 is energized by battery 15. Battery 15 is preferably of the rechargeable nickel-cadmium type, having a potential difference of 1.5 to 3 volts and outputting ¾ to 1 amp per hour. Battery 15 is rechargeable by means of battery recharger outlet 16, into which a battery recharger (not shown) is adapted to be connected.

In a preferred embodiment, the manicuring device has an electrical switch 17 mounted in housing 10. Switch 17 has an actuating member 18 projecting exteriorly of sidewall 13. Switch 17 is electrically wired in series relationship between motor means 14 and battery 15 so that the selective energization and de-energization of motor means 14 can be accomplished by actuating or de-actuating member 18. Switch 17 is preferably positioned near the end of the housing furthest from motor means 14 for convenient thumb actuation.

Shaft 19 extends from the front end of motor means 14, and is pointed in the direction of housing open end 12. Shaft 19 is rotatively driven by motor 14. Shaft 19 has disposed thereon a sleeve 50 and is secured to the sleeve. A washer housing 21 having a washer 20 is attached to the elongate housing 10, and functions as a guide for the washer to prevent excessive translational movement of shaft 19.

A circular offset means 22 is affixed near the front end of the shaft 19 at a non-perpendicular angle with respect to shaft 19. Affixed to circular offset means 22 is lower end 23 of attachment arm 24. Arm 24 may or may not be axially positioned with respect to shaft 19. The upper end 25 of attachment arm 24 is affixed to manicuring implement 26, attachment arm 24 being projected in a direction parallel to shaft 19. Upper end 25 preferably has a notch 27 adaptable to prevent attachment arm 24 and implement 26 from being accidentally pulled or displaced out of housing 10. Guide 28 guides the reciprocating movement of arm 24 and implement 26 to prevent side-to-side motion.

Figure 2A:
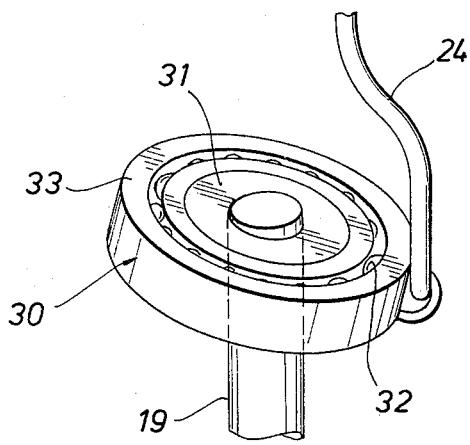
FIG. 2A is a perspective view of an offset bearing according to the present invention.
Figure 2B:
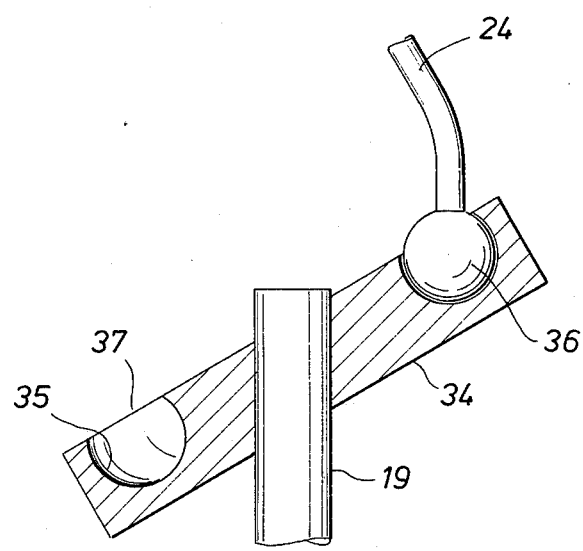
FIG. 2B is a side view of an offset sleeve according to the present invention.

FIGS. 2A and 2B more particularly depict offset means 22 of FIG. 1. Referring now to FIG. 2A, the offset means depicted is a circular bearing 30. Bearing 30 is comprised of three parts: inner portion 31, bearing balls 32, and an outer portion 33. Outer portion 33 encircles inner portion 31. The lower end of attachment arm 24 is affixed to outer portion 33. As shaft 19 rotates, outer portion 33 and arm 24 reciprocate.

FIG. 2B depicts a different embodiment of a circular offset means. Offset means 34 of FIG. 2B does not have a bearing as does the offset means depicted in FIG. 2A. Offset means 34 comprises a disk having an annular groove 35 in which lower end 36 of attachment arm 24 travels. As depicted in FIG. 2B, offset means 34 is offset with respect to shaft 19. Arm 24, which travels in groove 35, preferably has a lower end 36 which is larger than groove opening 37 at the top of groove 35 to prevent arm 24 from being displaced out of groove 35. As sleeve 34 rotates, arm 24 traveling in groove 35 reciprocates.

FIG. 3 is a side view of another embodiment of the drive means of the present invention using an offset plate 36. As depicted in FIG. 3, plate 36 is at a non-perpendicular angle with respect to shaft 19. The lower end of arm 37 has a notch 38 which travels along the perimeter or circumference of plate 36. Disposed around plate 36 and notch 38 is a retaining means 39 whose purpose is to keep notch 38 from slipping off the perimeter of plate 36 as plate 36 rotates. It may be seen that as plate 36 rotates, arm 37 and implement 26 reciprocate.

FIG. 4A depicts another embodiment of the drive means of the present invention. The lower end of attachment arm 40 is preferably affixed to a circular housing 41 which encircles cam sleeve 42 and is movable thereon. As more particularly shown in FIG. 4B, inside circular housing 41 and affixed to either housing 41 or attachment arm 40 is a pin member 51 which travels in grooves 43 and 44 on the outer surface of sleeve 42. Pin member 51 travels in downward groove 43 when arm 40, housing 41 and implement 26 are moving in a downward direction. Pin member 51 travels in a distinct upward groove 44 when arm 40, housing 41 and implement 26 are moving in an upward direction away from motor 14. Thus, as shaft 19 and sleeve 42 rotate, pin member 51, circular housing 41, arm 40, and implement 26 reciprocate. When pin member 51 reaches the end of groove 43 during its downward travel, it will reverse its direction when it reaches point 45 at the end of groove 43 and begins traveling upward in groove 44. Pin member 51 will continue to travel upward in groove 44 until it reaches point 46 where it reverses direction at the end of groove 44 and begins traveling in a downward direction in groove 43. This reversing process continues so long as shaft 19 and sleeve 42 rotate.

Manicuring implement 26 is detachable and preferably interchangeable with other implements. FIGS. 5A, 5B, and 5C depict examples of other implements which may be used. Implement 59 depicted in FIG. 5A has an emery board on side 60 and a brush on side 61. It is desirable to use an emery board surface during manicuring to prevent the nail clipping and splitting which may occur when a file with parallel cutting edges is reciprocated. The emery board surface has randomly placed sanding particles so that sanding occurs when the manicuring implement moves in both directions. FIG. 5B depicts implement 62 having a nail cleaning portion 63 at one end. Finally, FIG. 5C depicts implement 64 which has a buffing portion 65 at one end.

It is therefore apparent that the present invention is one well adapted to obtain all the advantages and features hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

What is claimed is:

1. A power manicuring device, comprising:
    an elongate hollow housing,
    an electrically powered motor means disposed in said housing, a source of electrical energy disposed in said housing and adapted to energize said motor means, a shaft extending from said motor means and rotatable about a shaft axis, an offset plate interconnected with said shaft and rotatable about said shaft axis, an attachment arm attached adjacent to the outer periphery of said offset plate and movably responsive to rotation by said offset plate, guide means for restricting movement of at least a portion of said attachment arm to a substantially linear direction, and a reciprocating manicuring implement interconnected with said attachment arm and driven linearly in both directions along its longitudinal axis by said electrically powered motor means.

2. A power manicuring device according to claim 1, further comprising:

a sleeve disposed on said shaft, a washer housing interconnected to said elongate housing and positioned between said motor and said offset means; and a washer interconnected to said sleeve and adapted for engagement with said washer housing to prevent excessive translational movement of said shaft.

3. A power manicuring device according to claim 1, further comprising:

an electrical switch mounted at the end of said elongate housing nearest said manicuring implement for controlling the selective energization and deenergization of said motor means by said source of electrical energy, and an actuating member projecting exteriorly of said housing.

4. A power manicuring device according to claim 1, wherein:

said manicuring implement has a surface with randomly placed sanding particles.

5. A power manicuring device according to claim 1, wherein said powered motor means revolves said shaft between 1500 and 2500 rpm under no load conditions.

6. A power manicuring device, comprising:

an elongate hollow housing, an electrically powered motor means disposed in said housing, a source of electrical energy disposed in said housing and adapted to energize said motor means, a rotatable shaft extending from said motor means, a rotatable inner portion interconnected with said shaft, bearing balls encircling said inner portion, a non-rotatable outer portion encircling said bearing balls, said inner portion, said bearing balls, and said outer portion comprising an offset means, an attachment arm connected with said outer portion and movably responsive to rotation by said inner portion, guide means for restricting movement of at least a portion of said attachment arm to a substantially linear direction, and a manicuring implement interconnected with said attachment arm.

7. A power manicuring device according to claim 6, further comprising:

an electrical switch mounted at the end of said elongate housing nearest said manicuring implement for controlling the selective energization and deenergization of said motor means by said source of electrical energy, and an actuating member projecting exteriorly of said housing.

8. A power manicuring device according to claim 6, wherein:

said manicuring implement has a surface with randomly placed sanding particles.

9. A power manicuring device according to claim 6, wherein said powered motor means revolves said shaft between 1500 and 2500 rpm under no load conditions.

10. A power manicuring device, comprising:

an elongate hollow housing, an electrically powered motor means disposed in said housing, a source of electrical energy disposed in said housing and adapted to energize said motor means, a rotatable shaft extending from said motor means, a cylindrical rod member interconnected with said shaft and having upward and downward angularly disposed cam grooves on the cylindrical surface of said rod member, a pin member slideably positionable in said upward and downward cam grooves and responsive to rotation of said shaft, an attachment arm connected to said pin member, guide means for restricting movement of at least a portion of said attachment arm to a substantially linear direction, and a manicuring implement connected to said attachment arm.

11. A power manicuring device according to claim 10, further comprising:

a sleeve disposed on said shaft, a washer housing interconnected to said elongate housing and positioned between said motor and said offset means; and a washer interconnected to said sleeve and adapted for engagement with said washer housing to prevent excessive translational movement of said shaft.

12. A power manicuring device according to claim 10, further comprising:

an electrical switch mounted at the end of said elongate housing nearest said manicuring implement for controlling the selective energization and deenergization of said motor means by said source of electrical energy, and an actuating member projecting exteriorly of said housing.

13. A power manicuring device according to claim 10, wherein:

said manicuring implement has a surface with randomly placed sanding particles.

14. A power manicuring device according to claim 10, wherein said manicuring implement is driven linearly in both directions along its longitudinal axis by said electrically powered motor means.

15. A power manicuring device according to claim 10, wherein said powered motor means revolves said shaft between 1500 to 2500 rpm under no load conditions.

* * * * *